United States Patent
Stearns et al.

(10) Patent No.: US 10,196,936 B2
(45) Date of Patent: Feb. 5, 2019

(54) AIR OIL COOLER AIRFLOW AUGMENTATION SYSTEM

(71) Applicant: United Technologies Corporation, Hartford, CT (US)

(72) Inventors: Ethan K. Stearns, Lebanon, CT (US); Jorn A. Glahn, Manchester, CT (US); Daniel J. McKaveney, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 616 days.

(21) Appl. No.: 14/774,412

(22) PCT Filed: Mar. 14, 2014

(86) PCT No.: PCT/US2014/027652
§ 371 (c)(1),
(2) Date: Sep. 10, 2015

(87) PCT Pub. No.: WO2014/200587
PCT Pub. Date: Dec. 18, 2014

(65) Prior Publication Data
US 2016/0024968 A1     Jan. 28, 2016

Related U.S. Application Data

(60) Provisional application No. 61/787,161, filed on Mar. 15, 2013.

(51) Int. Cl.
*F01D 25/18* (2006.01)
*F01D 25/20* (2006.01)
(Continued)

(52) U.S. Cl.
CPC .............. *F01D 25/20* (2013.01); *F01D 25/12* (2013.01); *F01D 25/125* (2013.01); *F01D 25/18* (2013.01);
(Continued)

(58) Field of Classification Search
CPC ...... F02C 7/06; F02C 7/12; F02C 7/14; F02C 7/16; F02C 7/18; F02C 7/185;
(Continued)

(56) References Cited

U.S. PATENT DOCUMENTS 3,080,716 A * 3/1963 Cummings ............... F02C 7/14
123/196 AB
4,020,632 A * 5/1977 Coffinberry ............... F02C 7/14
123/41.33
(Continued)

FOREIGN PATENT DOCUMENTS

EP     1898069 A2     3/2008

OTHER PUBLICATIONS

Connors, Jack, The Engines of Pratt & Whitney A Technical History, 2010, American Institute of Aeronautics and Astronautics, Inc., pp. 469-472.*
European Search Report for EP Application No. 14811180.0 dated Jun. 15, 2016.
International Preliminary Report on Patentability for International Application No. PCT/US2014/027652 dated Jul. 30, 2015.
International Search Report and Written Opinion for International Application No. PCT/US2014/027652 dated Jan. 7, 2015.

*Primary Examiner* — Gerald L Sung
*Assistant Examiner* — Marc Amar
(74) *Attorney, Agent, or Firm* — Carlson, Gaskey & Olds, P.C.

(57) ABSTRACT

An oil supply system for a gas turbine engine has a lubricant pump delivering lubricant to an outlet line. The outlet line is split into at least a hot line and into a cool line, with the hot line directed primarily to locations associated with an engine that are not intended to receive cooler lubricant, and the cool line directed through one or more heat exchangers at which lubricant is cooled. The cool line then is routed to a fan drive (Continued)

gear system of an associated gas turbine engine. A method and apparatus are disclosed. The heat exchangers include at least an air/oil cooler wherein air is pulled across the air/oil cooler to cool oil. The air/oil cooler is provided with an ejector tapping compressed air from a compressor section to increase airflow across the air/oil cooler.

18 Claims, 3 Drawing Sheets

(51) Int. Cl.
    *F02C 7/224*     (2006.01)
    *F02C 7/18*     (2006.01)
    *F01M 1/12*     (2006.01)
    *F02C 7/06*     (2006.01)
    *F02C 7/14*     (2006.01)
    *F02C 9/18*     (2006.01)
    *F01D 25/12*     (2006.01)

(52) U.S. Cl.
    CPC ............... *F01M 1/12* (2013.01); *F02C 7/06* (2013.01); *F02C 7/14* (2013.01); *F02C 7/185* (2013.01); *F02C 7/224* (2013.01); *F02C 9/18* (2013.01); *F05D 2220/32* (2013.01); *F05D 2220/323* (2013.01); *F05D 2240/35* (2013.01); *F05D 2260/205* (2013.01); *F05D 2260/213* (2013.01); *F05D 2260/232* (2013.01); *F05D 2260/40311* (2013.01); *F05D 2260/601* (2013.01); *F05D 2260/606* (2013.01); *F05D 2260/98* (2013.01); *Y02T 50/671* (2013.01); *Y02T 50/675* (2013.01)

(58) Field of Classification Search
    CPC .. F02C 7/224; F05D 2260/20; F05D 2260/98; F05D 2260/205; F05D 2260/213; F05D 2260/601; F01D 25/18; F01D 25/20; F01M 5/002; F01M 1/12; F01M 2001/123
    See application file for complete search history.

(56) References Cited

U.S. PATENT DOCUMENTS

| | | | | |
|---|---|---|---|---|
| 4,351,150 | A | | 9/1982 | Schulze |
| 4,354,345 | A | * | 10/1982 | Dreisbach, Jr. ........... F02C 7/14 60/39.08 |
| 5,438,823 | A | * | 8/1995 | Loxley .................... F01D 25/18 165/41 |
| 5,987,877 | A | | 11/1999 | Steiner |
| 6,282,881 | B1 | * | 9/2001 | Beutin ................... B64D 33/10 184/6.11 |
| 7,908,840 | B2 | * | 3/2011 | Schwarz ................. F01D 15/10 184/6.11 |
| 8,261,527 | B1 | * | 9/2012 | Stearns .................... F02C 7/06 60/39.08 |
| 9,046,002 | B2 | * | 6/2015 | Homeyer ............... F01D 21/00 |
| 2003/0136103 | A1 | * | 7/2003 | Reuter .................... F01D 25/20 60/39.08 |
| 2006/0120869 | A1 | * | 6/2006 | Wilson .................... F01D 5/147 416/97 R |
| 2007/0065274 | A1 | * | 3/2007 | Birrell .................... F01D 25/14 415/116 |
| 2007/0084188 | A1 | * | 4/2007 | Orlando .................. F01D 1/26 60/204 |
| 2007/0264133 | A1 | * | 11/2007 | Schwarz ............... F01D 25/125 417/110 |
| 2008/0006022 | A1 | * | 1/2008 | Schwarz .................. F02C 7/14 60/204 |
| 2008/0121376 | A1 | * | 5/2008 | Schwarz ................ F01D 15/10 165/104.28 |
| 2009/0014245 | A1 | * | 1/2009 | Shevchenko ........... F01D 21/10 184/6.4 |
| 2009/0317029 | A1 | * | 12/2009 | Dobek .................... F01D 25/16 384/490 |
| 2013/0086909 | A1 | * | 4/2013 | Wang ....................... F02C 9/36 60/730 |
| 2014/0083076 | A1 | * | 3/2014 | Phillips .................. F01D 25/18 60/39.08 |
| 2014/0271118 | A1 | * | 9/2014 | Junod ...................... F02C 7/06 415/1 |

* cited by examiner

AIR OIL COOLER AIRFLOW AUGMENTATION SYSTEM

BACKGROUND

This application relates to an oil system for providing oil to a gear associated with a geared turbofan in a gas turbine engine.

Gas turbine engines are known, and typically include a fan delivering air into a compressor section. Compressed air from the compressor section is delivered into a combustion section, mixed with fuel, and ignited. Products of this combustion pass downstream over turbine rotors which are driven to rotate.

A low pressure turbine rotor drives a low pressure compressor, and traditionally has driven a fan at the same rate of speed. More recently, a gear reduction has been included between the low pressure turbine and the fan such that the fan and the low pressure compressor can rotate at different speeds. Oil management systems typically provide oil to engine bearings and other locations within the engine. As a result of gears being added to turbofan engines, additional components require cooling, thereby necessitating new cooling systems and methodologies. Heat exchangers are utilized in such systems to maintain lubricant within desired thermal limits.

A heat exchanger may be utilized airflow to cool the lubricant. The heat exchanger is sized based on the available airflow during all operational conditions. Air flow available for cooling at low power static conditions may not be as much as is available during higher power flight conditions. The heat exchanger is necessarily increased in size to compensate for the lower airflow while maintaining the desired heat exchange capabilities.

Large heat exchanges provided based on lower power and operation inflicts a weight penalty that can reduce the efficiencies provided by the gear reduction. Accordingly, it is desirable to design and develop devise that provide the heat exchange capability while improving engine operating efficiency.

These and other features disclosed herein can be best understood from the following specification and drawings, the following of which is a brief description.

DETAILED DESCRIPTION

Figure 1:
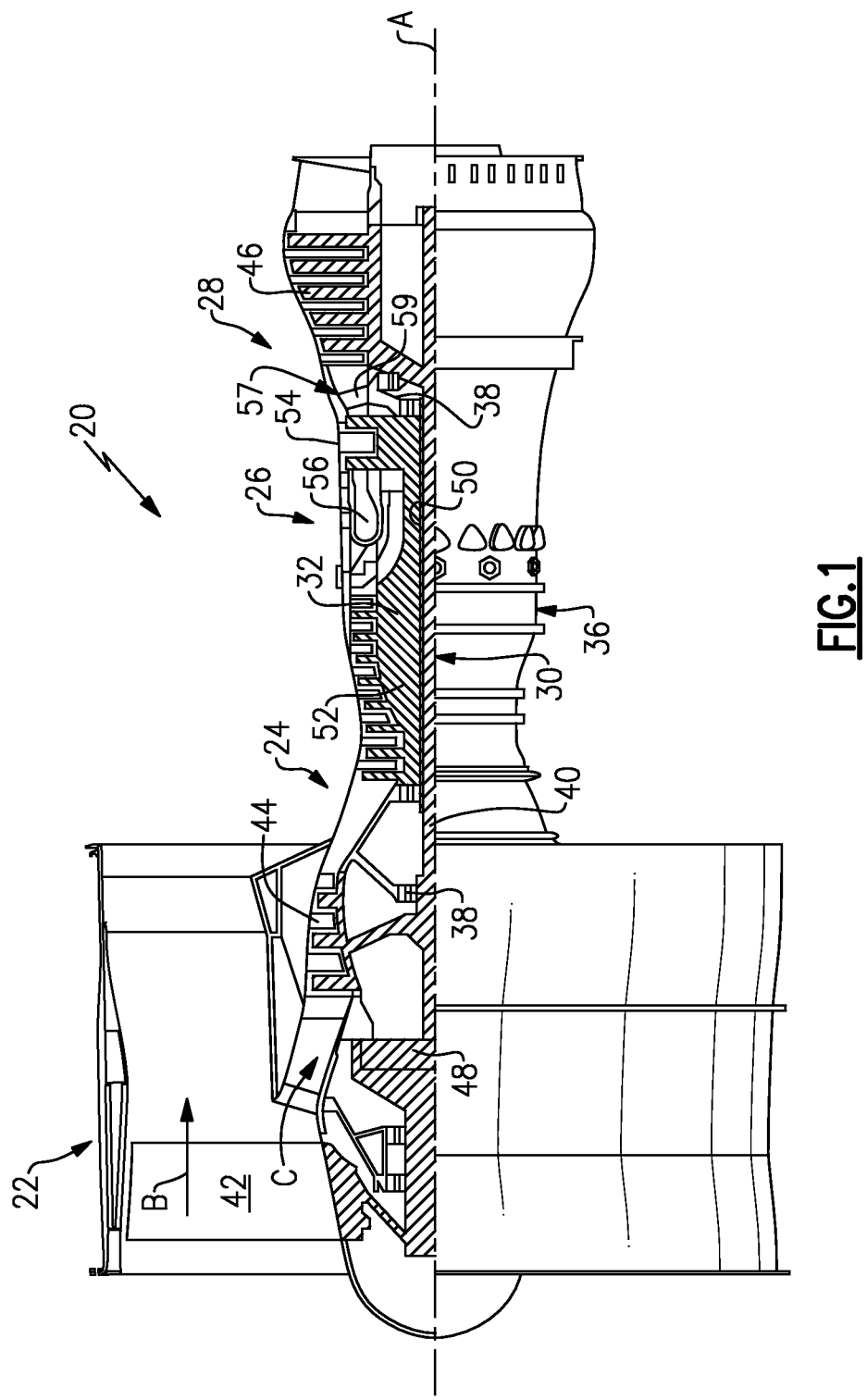
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 (shown schematically) to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the previously mentioned expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
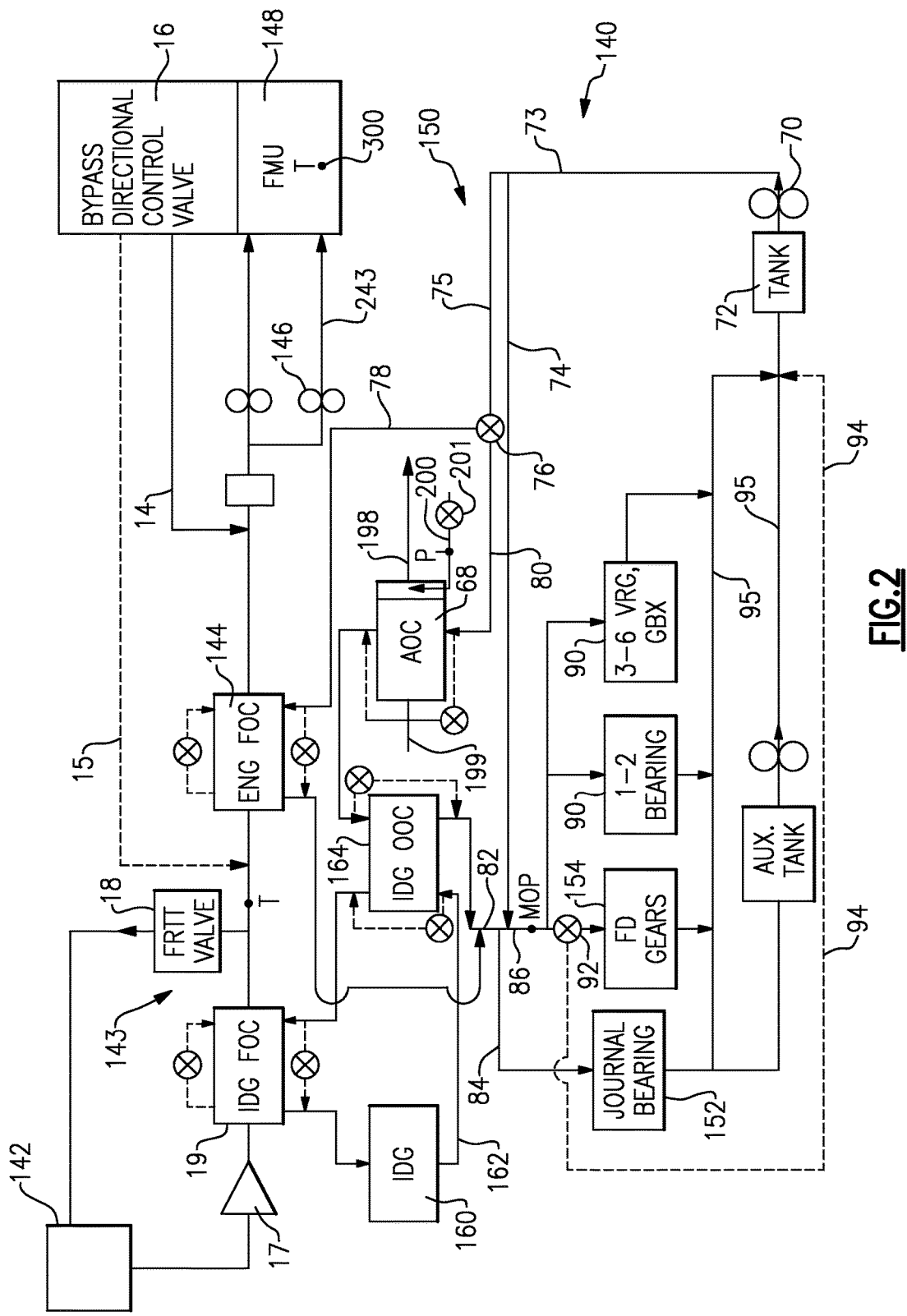
FIG. 2 is a schematic of an embodiment of an oil management system for the gas turbine engine of FIG. 1.

FIG. 2 illustrates an oil management system for the gas turbine engine system of FIG. 1. The oil management system 140 is utilized in association with a fuel system 143, and an integrated drive generator ("IDG") 160 and its oil cooling system circuit 162.

Fuel from a fuel tank 142 passes to a fuel/oil cooler 144. The fuel is heated, and cools a lubricant, as will be explained below. A main fuel pump 146 drives the fuel into further fuel lines 243 and then into a fuel management unit ("FMU") 148 associated with a combustor, such as combustor 26 as shown in FIG. 1. It is known in the art to heat the fuel to improve the efficiency of the overall engine. The fuel/oil cooler 144 provides this function.

At the same time, the IDG 160 is driven by turbine rotors to generate electricity for various uses on an aircraft. As shown in oil cooling system circuit 162, the oil from IDG 160 passes through an oil-to-oil cooler 164, and may also thereafter pass through a fuel oil cooler 19 before returning to the variable frequency generator 160.

A boost pump 17 may drive the fuel from the tank 142 through the fuel oil cooler 19 to heat the fuel, and cool the oil being returned to the generator 160. A valve 18 may selectively return fuel to the fuel tank 142. As also shown, a bypass directional control valve 16 selectively bypasses fuel away from the FMU 148 to either upstream or downstream of the engine FOC (144). The main fuel pump 146 may be a fixed displacement pump, and thus is less able to provide precise metering of the fuel being delivered to the FMU. The bypass valve 16 assists in ensuring the proper amount of fuel is delivered. As shown, the fuel may be returned through a line 15 to a location upstream of the fuel oil cooler 144 under certain conditions, low power for example. On the other hand, under other conditions, such as high power, the fuel is delivered through a line 14 to a location downstream of the fuel oil cooler. Since the fuel in either line 14 or 15 has already been heated, it may be necessary to provide more cooling to the oil, and thus an improved air/oil cooler 68 is utilized, and will be explained below.

An oil supply system 150 includes a main oil pump 70 taking oil from a main oil tank 72. The terms "oil" and "lubricant" are used interchangeably in this application and cover a fluid used to lubricate surfaces subject to relative rotation. The oil is delivered through a downstream line 73, and split between two lines 74 and 75. Line 74 is sent directly to line 86 without cooling. A modulating valve 76 is controlled to achieve a desired fuel temperature for the oil in line 75. As an example, a sensor 300 may send a signal to a control regarding a sensed temperature of the fuel downstream of the fuel oil cooler 144. The valve 76 routes the volume of oil between line 78 and 80 to achieve the desired temperature of the fuel.

The oil passing to line 78 passes through the fuel/oil cooler 144 and heats the fuel. The oil is cooled before returning to a common downstream line 82. The downstream line 82 could be called a "cool" oil line, as the oil will be cooler than the oil in "hot" line 74 which has not been cooled in any heat exchanger. For purposes of this application, line 75 is seen as part of the "cool" line even though the lubricant has yet to be cooled.

The oil directed by the valve 76 into line 80 passes through an air-to-oil cooler at 68 which is exposed to air which is cooler than the oil in line 80, and which cools the oil. Downstream of the air-to-oil cooler 68, the oil passes through the oil-to-oil cooler 164, and may actually be somewhat heated by cooling the oil for the IDG. Still, the oil reaching line 82 downstream of the oil-to-oil cooler 164 will be significantly cooler than the oil in line 74. Some of the oil in line 82 is directed through a line 84, to a bearing 152, which is part of the gear reduction 48 (see FIG. 1). Thus, cooler oil is supplied to the bearing 152 than is supplied from the line 74. As can be seen, a line 86 branches off of the "cool" line 82 at or near the point at which "cool" line 84 breaks away to go to the bearing 152. The lubricant in line 86 mixes with the lubricant in "hot" line 74, but downstream of the branch line 84. As shown, the fan drive gears 154 receive "hot" oil. On the other hand, the fan drive gears 154 may be placed to receive the cooler oil. The bearing 152 may include a bearing assembly for supporting rotation of a gear. The bearing assembly may include roller bearings such as ball, cylinder or any other roller bearing configuration that supports rotation. The bearing 152 may also be configured as a journal bearing.

It is desirable to provide cooler oil to these locations than is necessary to be supplied to bearings 90, or other locations associated with the engine. The bearings 90 as shown in FIG. 2 may equate to the several locations of bearings 38 as shown in FIG. 1.

On the other hand, cooling all of the oil associated with the engine bearings 90 would reduce the overall efficiency of the engine. Thus, splitting the oil, and cooling the oil to be directed to the bearing 152 provides cooler oil to those locations, while still allowing the hotter oil to be directed to locations that do not need cooler oil.

In addition, a valve 92 can selectively direct additional oil to the gears 154 if additional oil is necessary, such as at high power times. At other times, the valve 92 may direct lubricant through line 94 back to a return line 95 leading back to the oil tank 72.

The overall configuration thus results in an oil supply system which directs hotter oil to the locations which do not need cooler oil, but which also cools oil to be directed to areas associated with the fan drive gear.

Further details of a similar oil management system are disclosed in co-pending U.S. patent application Ser. No. 13/361,997, entitled "Gas Turbine Engine With Geared Turbofan and Oil Thermal Management System, filed on even date herewith, and owned by the assignee of the present application.

The differences between the present application and the above referenced application largely relate to the inclusion in the system of the bypass valve 16. Since fuel which has already been heated is returned by the bypass valve 16, there is more of a cooling load on the oil in the engine fuel oil cooler. Since the bypass valve 16 is returning fuel which has already been heated to locations upstream of the FMU, and temperature sensor 300, it is possible that less heating of the fuel, and subsequently less cooling of the oil will occur in the fuel oil cooler. Thus, the cooling load on the air/oil cooler 68 may be higher. For that reason, an ejector 198 is included, and a tap to a compressor source 200 (e.g., the sixth stage of the compressor section, for example, such as shown in FIG. 1) may tap high pressure air through the ejector 198 to draw additional air into a duct 199, shown schematically, and across the air/oil cooler 68. This will increase the amount of cooling of the oil in the air/oil cooler 68, and ensure the oil reaching line 82 is sufficiently cool to be sent to the bearing 152.

The use of the fuel oil cooler 19 also heats the fuel, and thus reduces the potential for adequately cooling the oil in the fuel/oil cooler 144 on its own. This again points to the use of the improved air/oil cooler.

Figure 3:
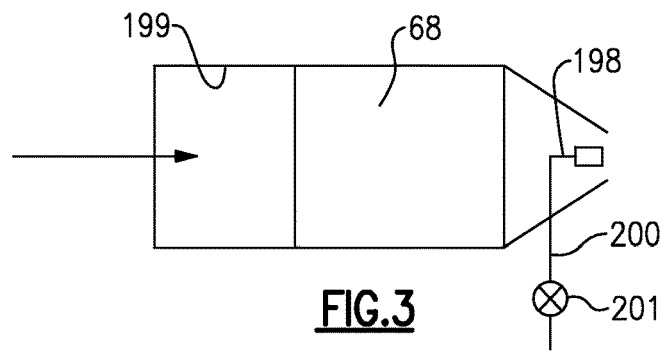
FIG. 3 shows an embodiment of an air/oil cooler used in the oil management system of FIG. 2.

FIG. 3 schematically shows further details of the air/oil cooler 68. As shown, a duct 199 bleeds air across the air/oil cooler 68. An ejector tap 198 from a source of compressed air 200 increases the flow of air to achieve adequate cooling of the oil. A valve 201 selectively controls this ejector flow.

The air/oil cooler is not in series with the fuel/oil cooler, however by further cooling the oil, when it is intermixed, it will be able to compensate for the hotter oil from the fuel/oil cooler 144.

Figure 4:
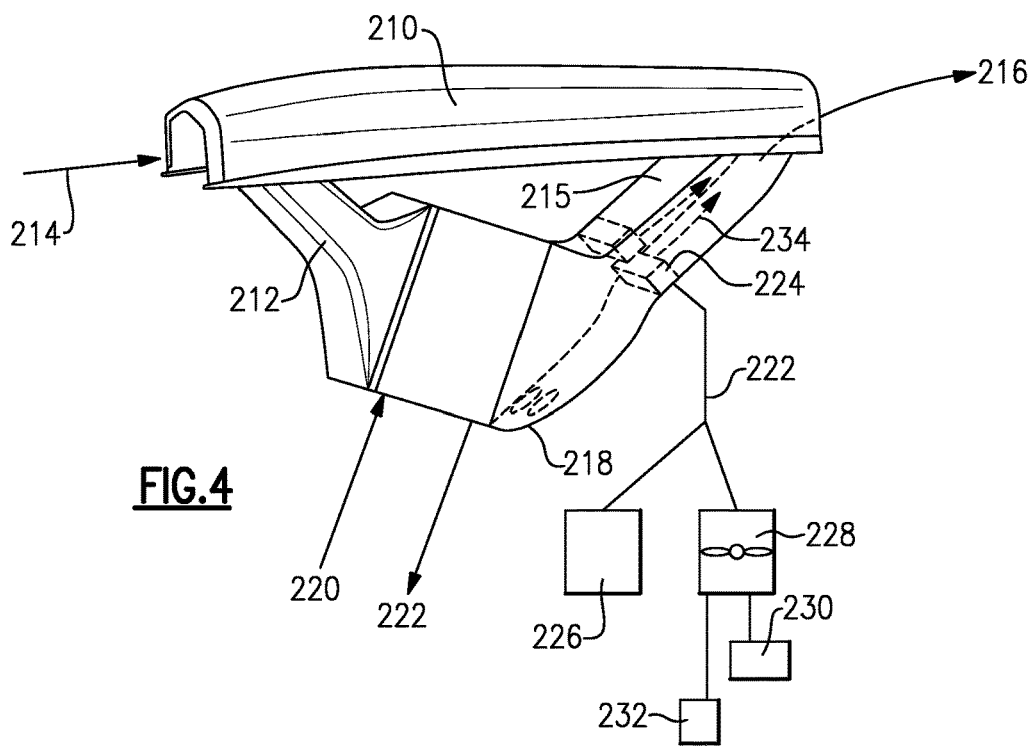
FIG. 4 is a schematic view of duct for an air/oil cooler including an ejector.
Figure 5:
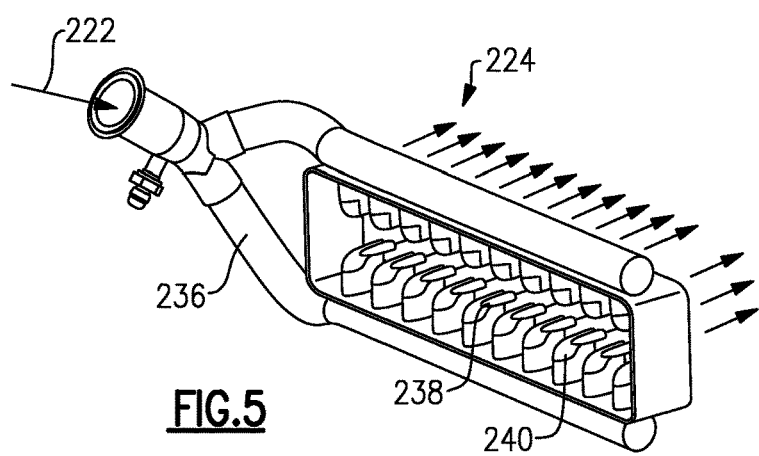
FIG. 5 is a perspective view of an example ejector of the air/oil cooler.

Referring to FIGS. 4 and 5, an example ejector 224 is supported within an exit duct 215 downstream from an air/oil heat exchanger 218. An inlet duct 212 receives inlet air 214 from a fairing 210. The fairing 210 is disposed within a bypass flow path B and directs the inlet air 214 into the inlet duct 212 and through the heat exchanger 218. It should be understood that although the example heat exchanger 218 is an air to oil heat exchanger, other configurations of heat exchangers that utilized airflow are within the contemplation of this disclosure.

The heat exchanger 218 receives in inlet oil flow 220 of hot oil that is then cooled and generates an outlet oil flow 222 that is cooler than the inlet oil flow 220. The ejector 224 includes a plurality of nozzles 238 that generate a high speed ejector airflow 234 that increases airflow through the exit duct 215 to increase cooling airflow through the heat exchanger 218.

Due to the lower fan pressure ratios provided in the example geared turbofan engine 20, adequate airflow through the heat exchanger 218 may not be available at low power, static conditions such as idling on the ground. A heat exchanger sized to provide adequate cooling at low power static conditions would be unnecessarily large for all other engine operating conditions. Accordingly, the example ejector 224 is supplied with compressed airflow to augment airflow through the heat exchanger 218.

Compressed airflow 222 is provided by a compressed air source. In one example, the compressed air is from a compressor section schematically indicated at 226. Compressed airflow 222 may also be provided by a fan 228. The fan 228 may be selectively actuated to provide augmented airflow 222 when required in low power static conditions. The fan 228 can be powered by an electric motor 230. The fan 228 may also be powered through a mechanical linkage 232 such as from a power take off shaft driven by a shaft of the engine 20.

The nozzles 238 are feed compressed airflow through manifold 236. Each of the nozzles 238 include shrouds 240 to reduce pressure losses within the duct. The nozzles 238 utilize the high pressure airflow 22 and eject high velocity airflow 234 from the ejector nozzles 238. The high velocity airflow 234 entrains additional cool air flow through the heat exchanger 218. The additional airflow provided through the ejector 224 enables a smaller more compact heat exchanger 218 to be utilized with augmented airflow during low power static conditions. During higher power operating conditions, the augmented airflow is not required as airflow drawn in through the fairing 210 provides sufficient cooling performance for the heat exchanger 218.

Accordingly, rather than utilizing a large heat exchanger suitable for low power static conditions for ground idle heat loads, a heat exchanger suitable for use during higher power conditions can be utilized with the addition of the selectively engageable ejector 224. Smaller heat exchanges can therefore be utilized to provide cooling requirements in all operational conditions.

Although an embodiment of this disclosure has been explained, a worker of ordinary skill in this art would recognize that certain modifications would come within the scope of this invention. For that reason, the following claims should be studied to determine the true scope and content of this invention.

The invention claimed is:

1. A lubricant supply system for a gas turbine engine comprising:
a lubricant pump delivering lubricant to an outlet line that splits into at least a hot line and a cool line, said hot line being directed primarily to locations associated with the gas turbine engine that are not intended to receive cooler lubricant, and said cool line being directed to at least one component with an operating temperature lower than the locations associated with the gas turbine engine that are not intended to receive cooler lubricant;
at least one heat exchanger within the cool line at which lubricant is cooled, the least one heat exchanger including at least an air/oil cooler wherein air is pulled across said air/oil cooler to cool lubricant, wherein at least a portion of the lubricant in said cool line is passed through a first fuel/oil cooler, the at least a portion of lubricant bypassing the air/oil cooler configured to cool the lubricant using fuel, leading to a combustion section of the gas turbine engine, and the lubricant in said hot line not passing through said first fuel/oil cooler; and
an ejector within the air/oil cooler for augmenting air flow across the air/oil cooler selectively responsive to an operating condition not providing air flow sufficient for cooling lubricant to desired temperature.

2. The system as recited in claim 1, including selectively actuating a fan to provide airflow through to the ejector to augment airflow across the air/oil cooler.

3. The system as recited in claim 1, including selectively providing airflow from a compressor section to provide airflow to the ejector to augment airflow across the air/oil cooler.

4. The system as set forth in claim 1, wherein a valve is positioned on said cool line and splits said cool line into two lines, with a first line being directed through said first fuel/oil cooler at which the lubricant is cooled by fuel leading to the combustion section for the gas turbine engine, and the lubricant in the cool line that is not being directed to the first fuel/oil cooler but being directed to at least one other cooler through a second line, and, said cool line being split into said two lines at a location downstream of a point where said outlet line is split into said hot line and said cool line.

5. The system as set forth in claim 4, wherein a bypass valve selectively bypasses fuel downstream of said fuel/oil cooler back upstream.

6. The system as set forth in claim 5, wherein said bypass valve alternatively directs the fuel upstream of the first fuel/oil cooler, or downstream of the first fuel/oil cooler.

7. The system as set forth in claim 4, wherein said at least one other cooler also includes an oil-to-oil cooler at which lubricant from a generator exchanges heat with the lubricant in said second line.

8. The system as set forth in claim 7, wherein lubricant from said generator is also passed through a second fuel/oil cooler at a location upstream of said first fuel/oil cooler.

9. A gas turbine engine comprising:
- a fan, a compressor section, including a low pressure compressor section and a high pressure compressor section;
- a combustor;
- a turbine section including both a low pressure turbine and a high pressure turbine section, and said low pressure turbine section driving said low pressure compressor section; and
- a fan drive gear system provided such that said low pressure turbine further driving said fan, with said fan and said low pressure compressor being driven at different speeds;
- a lubricant system including a lubricant pump delivering lubricant to an outlet line that splits into at least a hot line and a cool line, said hot line being directed primarily to locations associated with the gas turbine engine that are not intended to receive cooler lubricant, and said cool line being directed to at least one component with an operating temperature lower than the locations associated with the gas turbine engine that are not intended to receive cooler lubricant;
- at least one heat exchanger within the cool line at which lubricant is cooled, the least one heat exchanger including at least an air/oil cooler wherein air is pulled across said air/oil cooler to cool lubricant, wherein at least a portion of the lubricant in said cool line is passed through a first fuel/oil cooler, the at least a portion of the lubricant bypassing the air/oil cooler, configured to cool the lubricant using fuel, leading to a combustion section of the associated gas turbine engine, and the lubricant in said hot line not passing through said first fuel/oil cooler; and
- an ejector within the air/oil cooler for augmenting air flow across the air/oil cooler selectively responsive to an operating condition not providing air flow sufficient for cooling lubricant to desired temperature.

10. The gas turbine engine as recited in claim 9, including selectively actuating a fan to provide airflow through to the ejector to augment airflow across the air/oil cooler.

11. The gas turbine engine as recited in claim 9, including selectively providing airflow from a compressor section to provide airflow to the ejector to augment airflow across the air/oil cooler.

12. The gas turbine engine as set forth in claim 9, wherein said locations in the engine that are not intended to receive cooler lubricant include bearings associated with at least the turbine section.

13. The gas turbine engine as recited in claim 9, wherein a valve is positioned on said cool line and splits said cool line into two lines, with said first line being directed through the first fuel/oil cooler at which the lubricant is cooled by fuel leading to the combustion section for the gas turbine engine, and the lubricant in the cool line that is not being directed to the first fuel/oil cooler but being directed to at least one other cooler through a second line and, said cool line is split into said two lines at a location downstream of a point where said outlet line is split into said hot line and said cool line.

14. The gas turbine engine as recited in claim 13, wherein a bypass valve selectively bypasses fuel downstream of said first fuel/oil cooler back upstream.

15. The gas turbine engine as recited in claim 14, wherein said bypass valve alternatively directs the fuel upstream of the first fuel/oil cooler, or downstream of the first fuel/oil cooler.

16. The gas turbine engine as recited in claim 13, wherein said at least one other cooler also includes an oil-to-oil cooler at which lubricant from a generator exchanges heat with the lubricant in said second line.

17. The gas turbine engine as set forth in claim 14, wherein oil from said generator is also passed through a second fuel/oil cooler at a location upstream of said first fuel/oil cooler.

18. A method of managing lubricant supply for a gas turbine engine comprising the steps of:
- moving a lubricant from a main lubricant pump into an outlet line, and splitting the outlet line into a cool line and a hot line, the cool line which is delivered into at least one heat exchanger to cool the lubricant, and the cooled lubricant then being delivered to at least a one component requiring cooler lubricant;
- supplying lubricant from the hot line which is not passed through said at least one heat exchanger to bearings associated with at least a turbine section in the gas turbine engine; said at least one heat exchanger including at least an air/oil cooler wherein air is pulled across said air/oil cooler to cool lubricant, and said air/oil cooler being provided with an ejector selectively tapping compressed air to increase airflow across the air/oil cooler; and
- passing at least a portion of the lubricant in the cool line through a first fuel/oil cooler, the at least a portion of the lubricant bypassing the air/oil cooler, configured to cool the lubricant using fuel, leading to a combustion section of the gas turbine engine, and the lubricant in said hot line not passing through said first fuel/oil cooler.

* * * * *

UNITED STATES PATENT AND TRADEMARK OFFICE
CERTIFICATE OF CORRECTION

PATENT NO. : 10,196,936 B2
APPLICATION NO. : 14/774412
DATED : February 5, 2019
INVENTOR(S) : Ethan K. Stearns, Jorn A. Glahn and Daniel J. McKaveney Page 1 of 1

It is certified that error appears in the above-identified patent and that said Letters Patent is hereby corrected as shown below:

In the Claims

In Claim 18, Column 8, Line 33; replace "to at least a one component" with --to at least one component--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*